United States Patent
Hegarty et al.

(10) Patent No.: US 11,304,569 B2
(45) Date of Patent: Apr. 19, 2022

(54) CLEANING APPARATUS HOLDER

(71) Applicant: Tinkered Inc., Bellingham, WA (US)

(72) Inventors: Harry E. Hegarty, Bellingham, WA (US); Brett Van Leeuwen, Bellingham, WA (US); Matt Hoogestraat, Bellingham, WA (US)

(73) Assignee: Tinkered Inc., Bellingham, WA (US)

( * ) Notice: Subject to any disclaimer, the term of this patent is extended or adjusted under 35 U.S.C. 154(b) by 200 days.

(21) Appl. No.: 16/732,102

(22) Filed: Dec. 31, 2019

(65) Prior Publication Data

US 2020/0214505 A1  Jul. 9, 2020

Related U.S. Application Data

(60) Provisional application No. 62/788,072, filed on Jan. 3, 2019.

(51) Int. Cl.
*A47J 47/20* (2019.01)
*A46B 17/00* (2006.01)

(52) U.S. Cl.
CPC .............. *A47J 47/20* (2013.01); *A46B 17/00* (2013.01)

(58) Field of Classification Search
CPC ..................................................... A47J 47/20
USPC .............. 15/257.01, 257.1; 211/65; 248/110; 312/206
See application file for complete search history.

(56) References Cited

U.S. PATENT DOCUMENTS

| | | | |
|---|---|---|---|
| 2,315,566 A | 4/1943 | Watral et al. | |
| 4,009,777 A * | 3/1977 | Thomas | A45C 11/005 206/5.1 |
| 4,262,374 A * | 4/1981 | Mikiya | A61H 33/02 4/537 |
| 5,217,123 A | 6/1993 | Riley et al. | |
| 5,820,231 A * | 10/1998 | Schon | A47K 10/28 312/34.11 |
| 5,865,325 A | 2/1999 | Comstock | |

(Continued)

FOREIGN PATENT DOCUMENTS

| | | |
|---|---|---|
| CN | 211834266 U | 11/2020 |
| EP | 1076504 A1 | 2/2001 |
| KR | 20180002582 U | 8/2018 |

OTHER PUBLICATIONS

Fucets bathroom-kitchen-faucets.com; "Magnetic Kitchen Cloth Holder for dripping dish cloth", http://bathroom-kitchen-faucets.com/magnetic-kitchen-cloth-holder-for-dripping-dish-cloth/, 2016, 5 pages.

*Primary Examiner* — Lori L Baker
(74) *Attorney, Agent, or Firm* — Schacht Law Office, Inc.; Dwayne Rogge

(57) ABSTRACT

A cleaning apparatus holder assembly is described herein comprising in one example: a mounting pad configured to be attached to a work surface of a sink; the mounting pad comprising a first pivot component having a first axis of rotation; a swivel removably mounted to the mounting pad at the first pivot component and configured to rotate relative to the mounting pad about the first axis of rotation; the swivel comprising a second pivot component having a second axis of rotation not parallel to the first axis of rotation; and a resting arm mounted to the swivel at the second pivot component, configured to rotate relative to the swivel about the second axis of rotation; the second axis of rotation defining a lifting plane orthogonal to the second axis of rotation.

6 Claims, 5 Drawing Sheets

(56) References Cited

U.S. PATENT DOCUMENTS

| | | | |
|---|---|---|---|
| 5,964,645 A * | 10/1999 | Jemt | B24B 7/182 |
| | | | 451/354 |
| 6,367,638 B1 | 4/2002 | Gougian | |
| 6,651,830 B2 | 11/2003 | Pan | |
| 2003/0202902 A1 | 10/2003 | Elliott | |
| 2009/0032074 A1 * | 2/2009 | Mueller | A47L 13/26 |
| | | | 134/172 |
| 2009/0314730 A1 * | 12/2009 | Mansikkamaa | A47L 17/00 |
| | | | 211/113 |

* cited by examiner

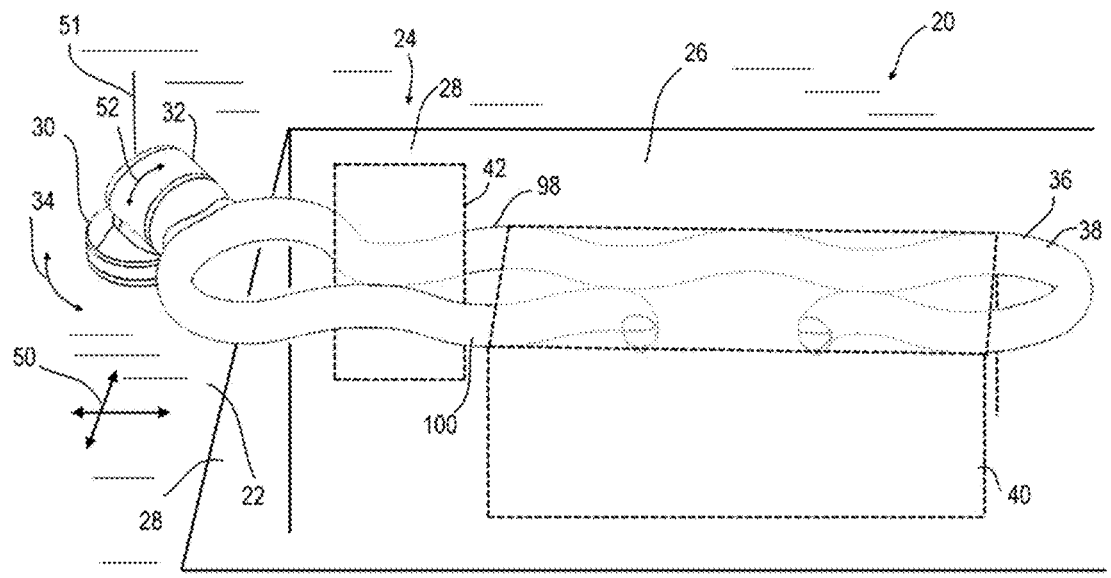
Fig. 1
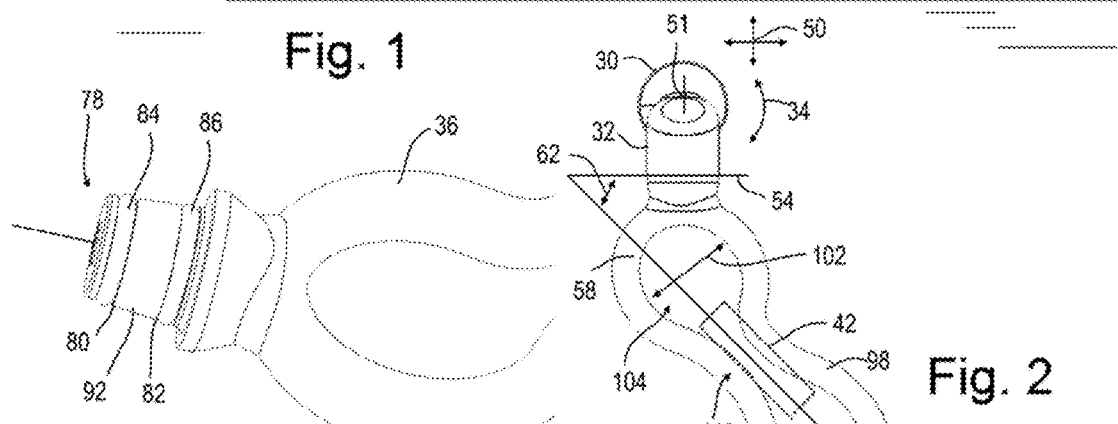
Fig. 2
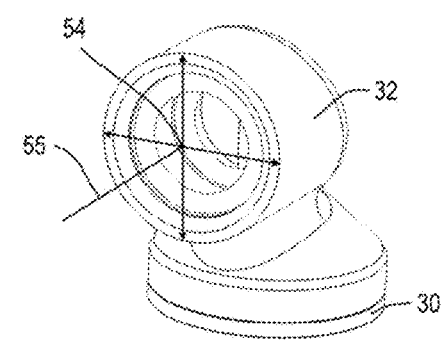
Fig. 3
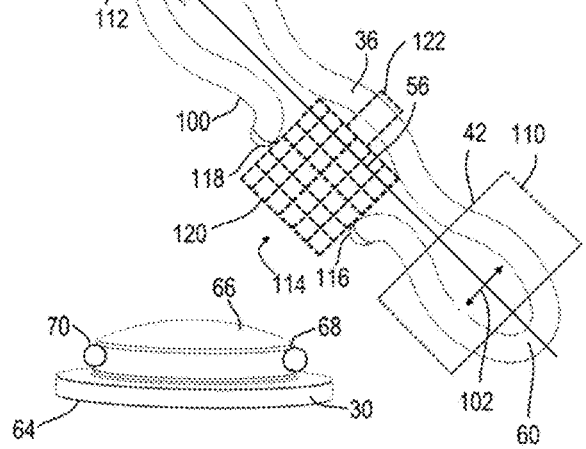
Fig. 4
Fig. 5

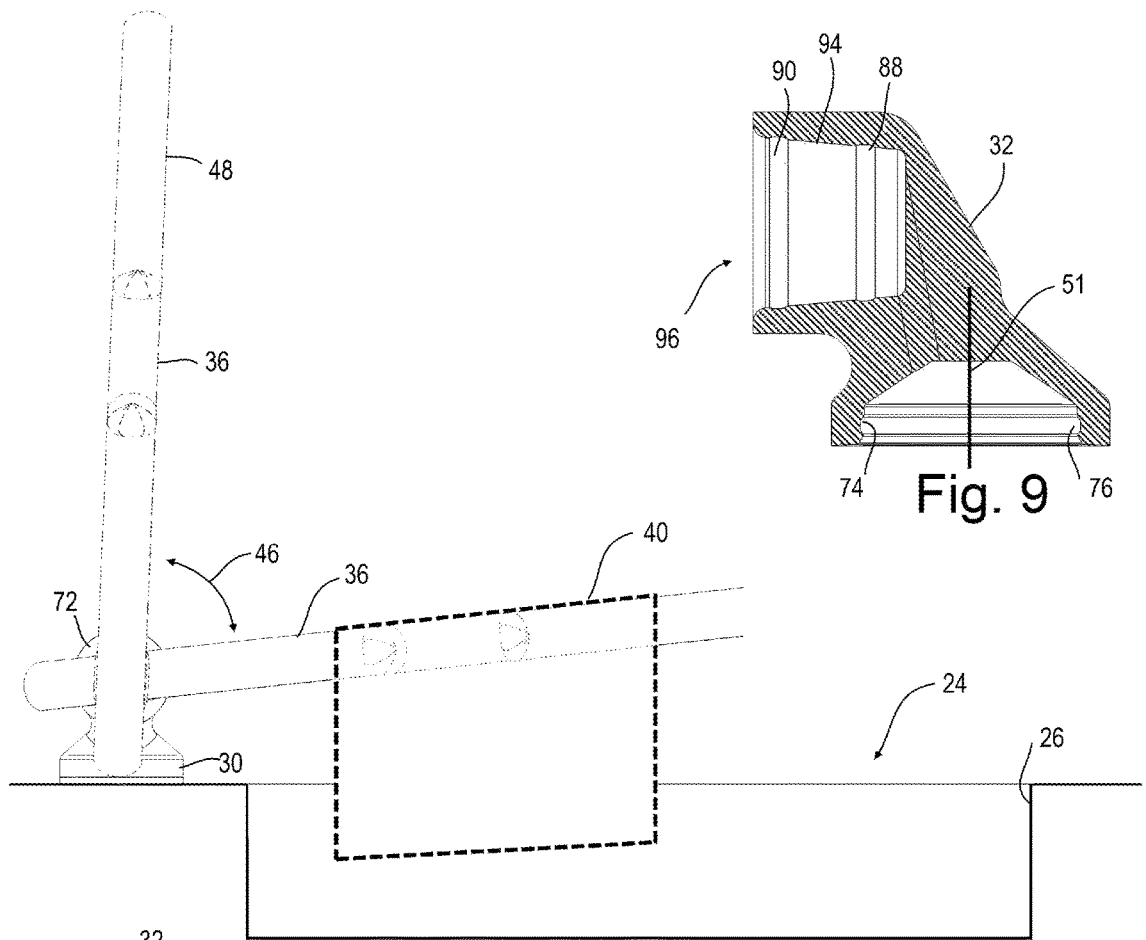
Fig. 9
Fig. 6
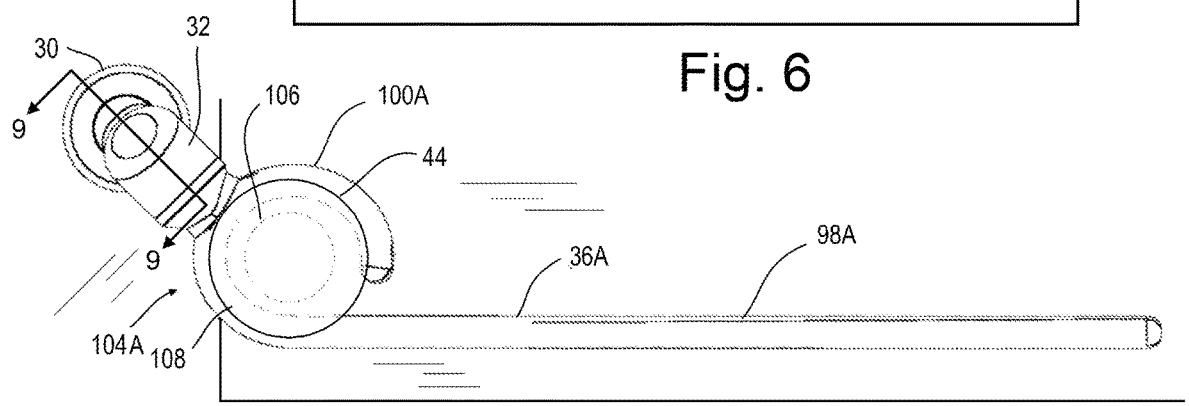
Fig. 7
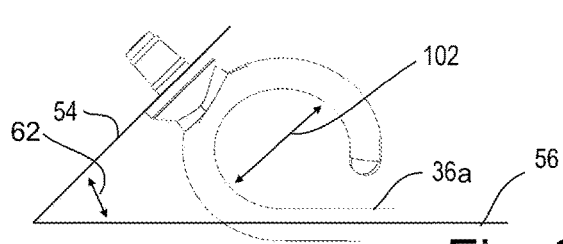
Fig. 8

CLEANING APPARATUS HOLDER

RELATED APPLICATIONS

This application claims priority of U.S. Provisional Patent Application Ser. No. 62/788,072 filed on Jan. 3, 2019 incorporated herein by reference.

BACKGROUND OF THE DISCLOSURE

Field of the Disclosure

This disclosure relates to the field of devices configured to hold cleaning apparatuses above a drainage basin. Such cleaning devices including dish rags, sponges, brushes, etc. The holder in one example configured to rotate in a first plane, and/or pivot in a second plane, and by so rotating and pivoting does not interfere with use of the drainage basin when the holder is not in a first position.

BRIEF SUMMARY OF THE DISCLOSURE

In addition to the primary purpose of the cleaning apparatus holder, as stated herein, several other objects and advantages of the disclosed apparatus include:
  provide a convenient supporting holder that allows a damp cleaning apparatus to dry with air freely circulating around the cleaning apparatus;
  provide simple installation of the cleaning apparatus holder without tools;
  provide a convenient cleaning apparatus holder for daily use that can be manufactured easily using few components;
  provide a lightweight, compact, durable cleaning apparatus holder that will be easy to package and ship;
  provide a useful cleaning apparatus holder for kitchens and other locations; and
  provide a visually appealing cleaning apparatus holder that can be used on virtually any substantially flat surface such as tile, glass, porcelain, laminate or metal above a basin for hanging a lightweight article such as a small towel, dish rag, washcloth, sponge, cleaning brush, or bag.

A cleaning apparatus holder assembly is disclosed herein comprising in one example: a mounting pad configured to be attached to a work surface of a sink; the mounting pad comprising a first pivot component having a first axis of rotation; a swivel removably mounted to the mounting pad at the first pivot component and configured to rotate relative to the mounting pad about the first axis of rotation; the swivel comprising a second pivot component having a second axis of rotation not parallel to the first axis of rotation; and a resting arm mounted to the swivel at the second pivot component, configured to rotate relative to the swivel about the second axis of rotation; the second axis of rotation defining a lifting plane orthogonal to the second axis of rotation.

The cleaning apparatus holder as recited herein may be arranged wherein the resting arm comprises a longitudinal axis at an angle of 0° to the lifting plane, as such the longitudinal axis of the resting arm is orthogonal to the lifting axis. In a narrower range, the angle is between 5° and 85° to the lifting plane. The cleaning apparatus holder as recited herein may be arranged wherein the resting arm comprises a longitudinal axis at an angle between 30° and 60° to the lifting plane. In a particular example, the angle of the longitudinal axis of the lifting arm is 45° to the lifting plane.

The cleaning apparatus holder as recited herein may be arranged wherein the swivel is removably attached to the mounting pad.

The cleaning apparatus holder as recited herein may be arranged wherein the resting arm comprises a first shaft, a second shaft; the first shaft and the second shaft substantially aligned with the longitudinal axis of the resting arm and substantially not parallel to each other, thus forming a varying gap therebetween.

BRIEF DESCRIPTION OF THE SEVERAL VIEWS OF THE DRAWINGS

FIG. 1 is a top isometric view of one example of the disclosed cleaning apparatus holder mounted to a work surface adjacent a sink basin.

FIG. 2 is a top view of the example shown in FIG. 1.

FIG. 3 is an enlarged view of one component of the example shown in FIG. 1.

FIG. 4 is an enlarged view of one component of the example shown in FIG. 1.

FIG. 5 is an enlarged view of one component of the example shown in FIG. 1.

FIG. 6 is a side view of the example shown in FIG. 1 in use.

FIG. 7 is a top view of the example shown in FIG. 1 with a variant of one component.

FIG. 8 is an enlarged view of one component of the example shown in FIG. 7.

FIG. 9 is an enlarged cross-sectional view of the swivel component of FIG. 7 taken along line 9-9.

DETAILED DESCRIPTION OF THE DISCLOSURE

Figure 10:
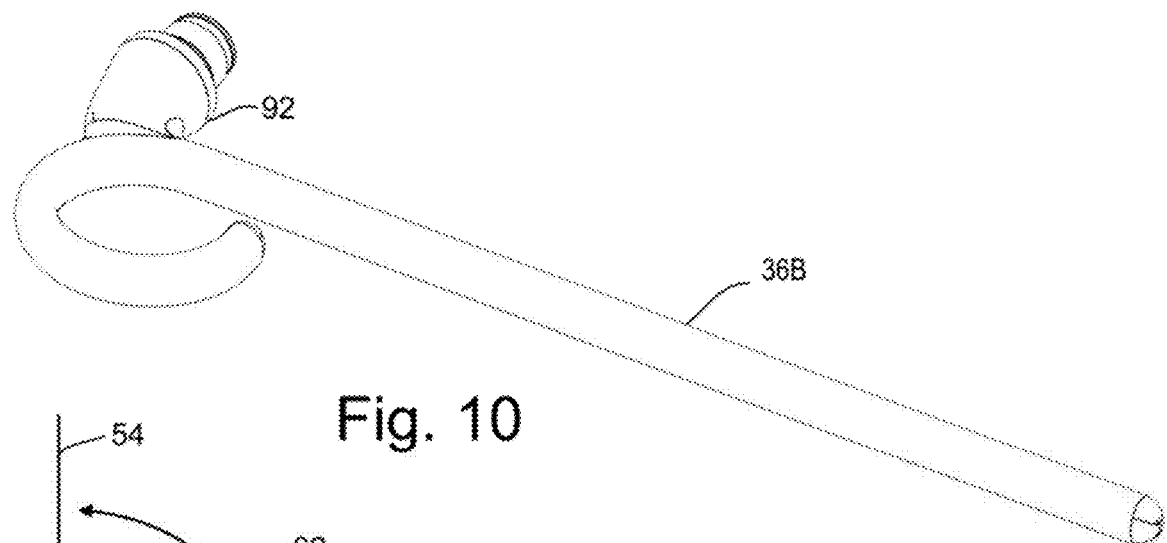
FIG. 10 is an isometric view of another example of the resting arm component of the example shown in FIG. 1.

A cleaning apparatus holder for retaining cleaning apparatus such as washcloths, sponges, brushes, scouring pads, etc. to be stored or dried, which can be used in conjunction with a drain basin, such as a sink, or as a stand-alone system. The term sink used herein to include a drain basin or receptacle, as in a kitchen or laundry, usually connected with a water supply and drainage system, for washing dishes, clothing, etc. The apparatus having a base component fixed in position relative to the drain basin, with a rotating arm component removably fixed to the base component.

In the field of cleaning apparatuses in use in household and commercial kitchens, bathrooms, shops, workplaces, etc. it is often desired to dry the cleaning apparatus between use or at a minimum that a substantial portion of excess cleaning fluids (e.g. water, detergents) drain from the cleaning apparatus between to reduce bacterial growth, reduce odors, and to result in a cleaner and more pleasing environment.

In use, cleaning apparatus such as wash cloths are often suspended from a faucet causing a situation where the cleaning apparatus is in the way of other use of the sink basin. The position of the cleaning apparatus over the faucet also results in the draining fluid from the dish cleaning apparatus rag falling near the outlet of the faucet, potentially causing an unsanitary condition. In other examples such as with a split sink (left and right basins), a cleaning apparatus is rested upon the separator wall between the two sink basins, or on the perimeter edge of the sink basin. In this position the cleaning apparatus does not dry properly, as there is no airflow through the cleaning apparatus, airflow blocked in part by the sidewall of the sink basin. In addition, a sponge, a cleaning brush, etc. is not easily positioned (rested) on a faucet, nor on a sink separator.

Thus, it is common for sponges, cleaning brushes, dishrags, scouring pads, etc. and equivalents (each of these and equivalents herein referred to collectively as cleaning apparatus) to be stored on a work surface adjacent a sink basin or in some sort of draining holder. In such a position there are several concerns including that the cleaning apparatus may not adequately drain, may not have sufficient airflow there around, and liquids therefrom may not drain into the sink basin, thus resulting in a pool of liquid and dried solids in which the cleaning apparatus rests, causing an unsanitary condition.

Known corrections including mounting of baskets, racks, etc. to an interior surface of the sink basin where they are in the way of cleaning operations within the sink basin. Other known corrections include drainage trays sitting next to the sink basin on the work surface. These drainage trays normally or commonly result in inadequate airflow around the cleaning apparatus and also tend to cause an unsanitary condition and that as some of the fluid evaporates; detergents, biologic matter etc. remain behind as a scum on the drainage tray.

Other known corrections include magnetically fastening of baskets, racks etc. to a sink basin or to an adjacent work surface. Such magnetic attachment has been tested and found inadequate in the support of large, wet dishrags, and other heavy cleaning apparatuses also tend to become displaced when accidentally contacted. Thus a more secure fastening system is disclosed herein.

The object of several examples disclosed herein is to provide a cleaning apparatus holder for retaining items to be dried and/or stored. The cleaning apparatus holder can be used in conjunction with a drain basin such as a sink. In one example the cleaning apparatus holder is used to support the cleaning apparatus above the drain basin. The cleaning apparatus holder allowing sufficient airflow around the cleaning apparatus, and to be easily repositionable without removing the cleaning apparatus holder from the work surface to which it is attached and in one example to allow for easy pivoting/rotating of several components of the cleaning apparatus holder so that neither the cleaning apparatus holder nor the cleaning apparatus suspended therefrom interfere with use of the drain basin for other activities. The term "swivel" used herein defines: a fastening device that allows the thing fastened to turn around freely upon it, especially to turn in a full circle; such a device consisting of two parts, each of which turns around independently, as a compound link of a chain, one part of which turns freely in the other; a pivoted support.

The term "sink" used herein to loosely describe a basin or receptacle, as in a kitchen or laundry, usually connected with a water supply and drainage system, for washing dishes, clothing, etc.

One such cleaning apparatus, in the form of a scrubbing brush is shown in each of U.S. Pat. Nos. D688,877S1, 6,210,064B1, D817,004S1, D817,004S1, and 6,250,833B1 each incorporated herein by reference. These examples show a brush with a handle for grasping by a user.

Figure 14:
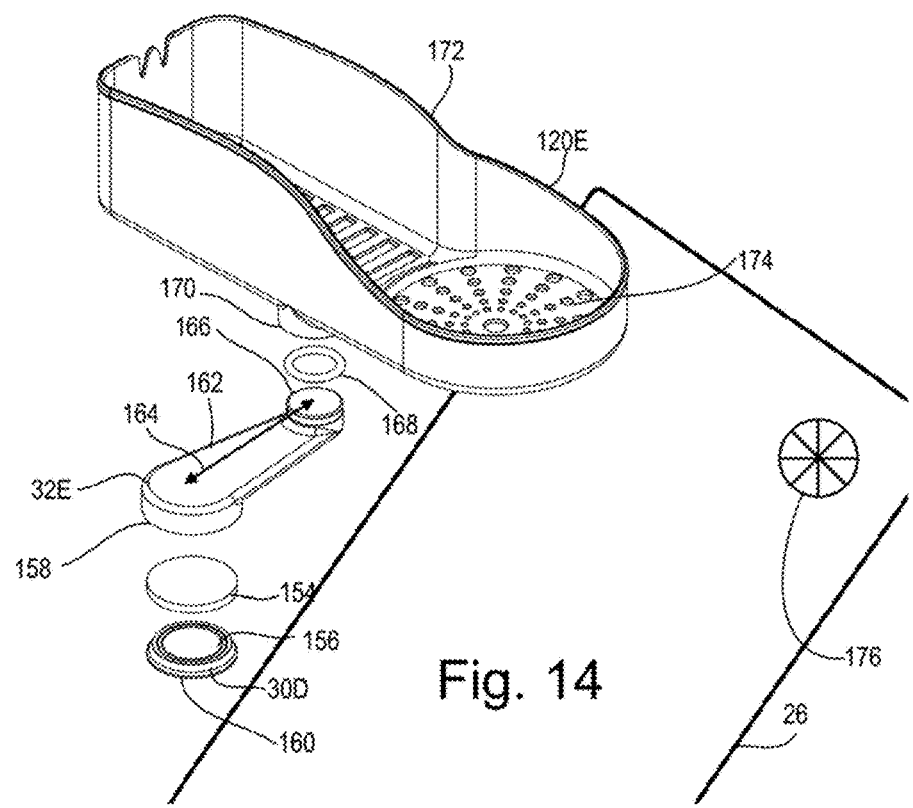
FIG. 14 is an exploded perspective view of another example of the disclosed cleaning apparatus holder.

In this disclosure, functionally similar structures are labeled with an alphanumeric label where a numeric prefix denotes a general structure and a alphabetic suffix denotes a particular structure. For example, a generic basket 120 is shown in FIG. 2 and a particular basket structure 120E is shown in FIG. 14.

Looking to FIG. 1 is shown a cleaning apparatus holder assembly 20 attached to a work surface 22. The work surface 22 in this example is adjacent a sink 24 having a drain basin 26 defined by basin sidewalls 28. In this example it can be seen that a mounting pad 30 is attached to the work surface 22, and a swivel 32 is attached to the mounting pad 30 and configured to rotate relative to the mounting pad 30. In another example, the mounting pad 30 and swivel 32 are a unitary structure or otherwise configured to not rotate relative to each other. In this example, the swivel 32 is configured to rotate relative to the mounting pad 30 in a rotating direction 34 substantially in the plane of the work surface 22 to which the mounting pad 30 is attached. For example, where the work surface is a horizontally aligned counter top, the rotating direction 34 may be in a horizontal plane. The mounting pad 30 may also be attached to a wall, appliance, the basin sidewall 28, or other secure locations where the rotating direction 34 may be parallel to the plane of the structure to which the mounting pad 30 is attached.

In the example shown, a resting arm 36 extends from the swivel 32 and extends outward above the basin 26 in such that any liquid draining from the cleaning apparatus attached thereto will drip or drain into the drain basin 26, away from the cleaning apparatus allowing for sufficient drying and a significant reduction in health concerns, odors, etc.

The example shown in FIG. 1-2 illustrates that the resting arm 36 in a first (use) position 38 where the resting arm 36 is positioned above the basin 26. In this first position 38, a dishrag 40, sponge 42, cleaning brush 44, etc. (cleaning apparatus 45) supported by the resting arm 36 is positioned above the base and 26 such that any liquids including water, detergents, etc. draining from the cleaning apparatus 45 will drip into the basin 26. When the resting arm 36 is rotated upward (46 of FIG. 6) to a second position 48; the resting arm 36 may or may not be positioned above the basin 26. In this second position 48, the storage arm 36 is configured to not interfere with other actions performed in or about the basin 26. Returning to FIG. 1, the resting arm 36 of this example may rotate about a rotating plane 50 in the rotating direction 34 about a rotating axis 51. In this example, the rotating plane 50 is substantially parallel to the work surface 22, although other configurations may also operate as intended. The resting arm 36 is configured to revolve in a rotating plane 50 parallel to the surface to which the mounting pad 30 is attached wherein the resting arm 36 may be the positioned at various locations above the drain basin 26, or may be rotated to a position entirely over the work surface 22 and not above any significant portion of the basin 26. The resting arm 36 rotates about a rotating axis 51 perpendicular to the rotating plane 50.

In addition to the rotating direction 34, the resting arm 36 in one example is configured to pivot in a lifting direction 52 generally orthogonal to the rotating plane 50. The resting arm 36 configured to be pivoted upwards 46 in a lifting plane 54 (see FIG. 2) in the lifting direction 52 about a lifting axis 55. In one example, the resting arm 36 comprises a longitudinal axis 56 aligned with the major length/axis thereof from a proximal end 58 near the mounting pad 30 to a distal end 60 away from the mounting pad 30. In the example shown in FIG. 2 and in FIG. 8 it can be seen that the angle 62 of the lifting plane 54 measured to the longitudinal axis 56 is greater than 0°, and in one example is less than 90°. In a narrower range the angle 62 is between 5° and 85°. In an even narrower range the angle 62 is between 30° and 60°. In one example the angle 62 is 45°±5°. In another example the angle 62 is 90°±5°

Looking to the example shown in FIG. 5, the mounting pad 30 is shown having a bottom surface 64 which is attached to the work surface 22 by way of adhesives, suction cups, rigid fasteners such as screws, nuts, bolts or other similar and equivalent fasteners including rivets, magnets, welding, brazing etc. In one example, an adhesive 64 is placed between the mounting pad 30 and the work surface 22 and thus the mounting pad 30 is adhered to the work surface 22. In one particular example, a layer of two-sided peel and stick tape known in the art is utilized. The peel and stick tape having an adhesive allowing a substantially permanent adhesion between the work surface 22 and the mounting pad 30. Such adhesive tapes often comprise a removable film that is removed from the adhesive layer immediately prior to attachment of the mounting pad 30 to the work surface 22. Testing has shown that a very secure and nearly permanent attachment between the mounting pad 30 and work surface 22 is required in some applications to ensure that the cleaning apparatus holder 20 remains attached to the work surface 22. Thus, in one example a fastener passing through a surface defining a hole in the work surface may be utilized, with a fastener such as a screw or bolt, or alternately a snap-fit or press-in connection may be used.

In another example, the force that can be exerted between the mounting pad 30 and the work surface 22 by the fastening components there between is more than the force required to separate the mounting pad 30 from the swivel 32 an/or to break the resting arm 36 or other components. Thus, the swivel 32 and attached resting arm 36 separate from the mounting pad 30 when force is applied before the components are broken or otherwise separated by a large force exerted on them, and the mounting pad 30 will remain attached to the work surface 22 for easy re-attachment of the swivel 32 thereto.

FIG. 5 also illustrates an example where the mounting pad 30 comprises an upper region 66 including an O-ring receiver 68 into which is placed an O-ring 70. In FIG. 9 the interior of the swivel 32 is shown, including an O-ring receiver 74. In use the O-ring 70 is placed on the O-ring receiver 68 and the swivel 32 is placed on the mounting pad 30 such that the O-ring 70 is fitted into the O-ring receiver 74 and a snap-fit arrangement wherein the swivel 32 is configured to rotate about the mounting pad 30 by way of interaction between the O-ring 70 and O-ring receivers 68/74. In this example, this swivel 32 comprises a recess 76 into which is fitted the components of the mounting pad 30 configured to attach the mounting pad 30 to the swivel 32. Other designs could be implemented provided that the swivel 32 is configured to rotate relative to the mounting pad 30.

A similar arrangement is shown in detail in FIG. 3 illustrating a friction component 78 of the resting arm 36. In this example, the friction component 78 comprises a plurality of O-ring receivers 80/82. In use, O-rings 84/86 are fitted into these O-ring receivers 80/82 respectively. In the example of FIG. 4 and in FIG. 9 the swivel 32 comprises a similar plurality of O-ring receivers 88/90 configured to engage the O-rings 84/86 respectively. In addition, the friction component 78 comprises an outer tapered (conic) surface 92 configured to engage an inner tapered (conic) surface 94 of the swivel 32 for ease in installation. To connect these components 92/94, the friction component 78 is inserted into the friction component receiver 96 until the O-rings 84/86 engage each of the O-ring receivers 80/82 and O-ring receivers 88/90. The friction component 78 is thus fitted to the swivel 32 in such a way that the resting arm 36 is permitted to pivot about the swivel 32 in the lifting plane 54 with a degree of friction that allows the resting arm to retain its position when a cleaning apparatus 45 is attached thereto. In one example, the force required to pivot the resting arm 36 in the lifting plane 54 is less than the force required to release the swivel 32 from the mounting pad 30. Likewise, the force required to remove the swivel 32 from the mounting pad 30 is less than the force required to remove the mounting pad 30 from the work surface 22. In most applications, it will be desired that the force required to remove the mounting pad 30 from the work surface 22 is not sufficient to damage the work surface 22.

The O-rings 84 and 86 also provide resilience such that the vertical position of the resting arm 36 can be held in place when a cleaning apparatus is attached thereto and moved by a user when force greater than the force exerted by weight of a cleaning apparatus is exerted on the resting arm 36. This position resilience may be overcome by a user manually, or if an object heavier than a wet (heavy) washcloth 40, wet (heavy) sponge 42 or wet/water filled (heavy) scrubbing brush 44 is fitted to the resting arm 36. In one example, the scrubbing brush 44 is fitted to the resting arm 36 relatively close to the swivel 32 such that the leverage on the swivel 32 is reduced.

Looking to FIG. 1 and FIG. 2, an example illustrating wherein the resting arm 36 comprises a plurality of shafts including a first shaft 98 and a second shaft 100 substantially aligned with the longitudinal axis 56 of the resting arm 36 and substantially not parallel to each other. In this example, the first shaft 98 and second shaft 100 may be directly attached to the swivel 32 and extend therefrom generally along the longitudinal axis 56. The first shaft 98 and second shaft 100 substantially not parallel to each other, in this example forming a varying gap between them.

In the example shown in FIG. 2, at the swivel 32, the first shaft 98 and second shaft 100 are offset by a distance 102 forming a brush receiver 104. The brush receiver 104 configured as shown in FIG. 7 to allow a first portion 106 such as the handle of the scrubbing brush 44 to pass through the diameter 102 while a second, larger portion 108 of the scrubbing brush 44 does not pass there through and thus rests upon the brush receiver 104 portion of the resting arm 36. In one example, the larger portion 108 of the scrubbing brush comprises a head having bristles extending there from and the first portion 106 comprises an elongate handle is known in the art.

Figure 15:
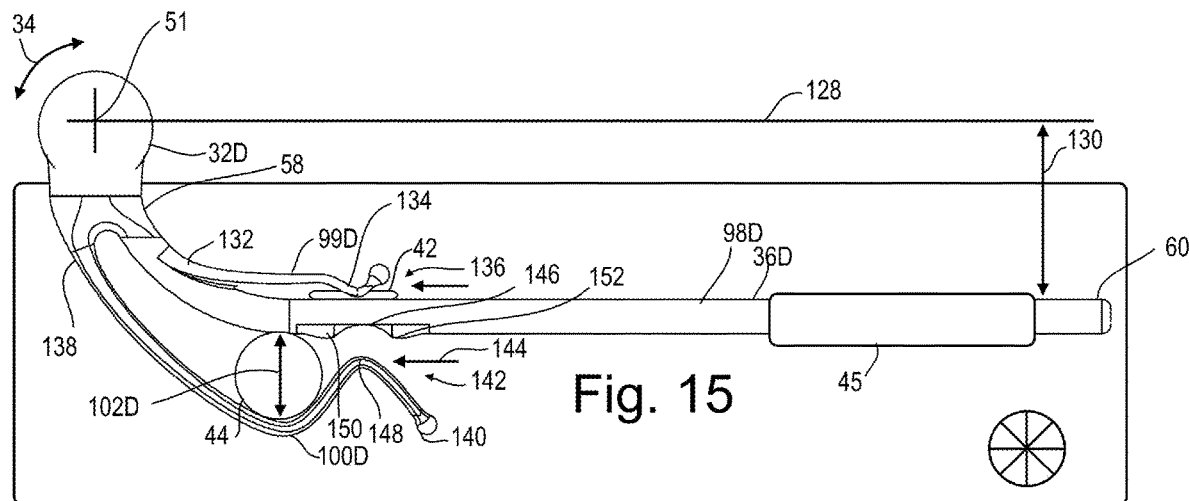
FIG. 15 is a top view of the example shown in FIG. 13.

In addition, the example shown in FIG. 1 shows that the first shaft 98 and second shaft 100 are not parallel thus in some regions providing a resting area 110 defined by the first shaft 98 and second shaft 100 with a gap 102 (102D in FIG. 15) there between. A sponge 42 or other cleaning apparatus may be stored on the resting area 110 and thus drain into the basin 26 without substantially extending below the resting arm 36.

In addition, in one or more positions between the first shaft 98 and second shaft 100 there may be a smaller gap forming a clamping position 112 into which a sponge 42, dishrag 40, scrubbing brush 44, or other cleaning apparatus may be frictionally engaged/clamped between the first shaft 98 and second shaft 100 and held in place during storage and drying. Again, in this position, the cleaning apparatus may be positioned to drip or drain into the basin 26.

To facilitate attachment of a scrubbing brush 44 or sponge 42 between the first shaft 98 and second shaft 100, the sponge receiver 114 may be provided between the ends 116/118 of the first shaft 98 and second shaft 100 respectively. In the example shown, this sponge receiver 114 is positioned between the swivel 32 and the distal end of the resting arm 36 in that the distal end of the first shaft 98 forms a bend of nearly 360° and thus doubles back on itself toward the swivel 32. Although the term sponge receiver 114 is used, this gap between the ends of the first shaft 98 and second shaft 100 is understood to receive scrubbing brushes 44, wash cloths 40 etc.

In one example, a washcloth 40 may be draped over the resting arm 36 and hung there from above the base and 26 allowed to dry.

In another example, shown in FIG. 7 the resting arm 36 is shown with a substantially straight linear first shaft 98A and the second shaft 100A is significantly shorter, forming a brush receiver 104A and not substantially extending there past.

In one example, all components of the disclosed cleaning apparatus holder 20 may be configured to be safely cleaned in a dishwasher, using very hot cleansers under high pressure without deterioration of the holder 20.

In one example, the components 30, 32, 36, are formed of an anti-microbial composition. Such materials include plastic additives that reduce or eliminate the growth of microbials on the components.

In one example, each component (mounting pad 30, swivel 32, resting arm 36) may be made of metals, polymers, ceramics, etc. by injection molding, casting, or machining.

In one example, a basket 120 may be attached to the resting arm 36. The basket 120 of this example formed of a perforated or wire mesh receptacle for supporting a cleaning apparatus 45, such as small brushes, sponges, etc. on the resting arm 36. The basket 120 may be pressed between the ends 116/118 of the first shaft 98 and second shaft 100 respectively. Alternatively, or in addition, the basket 120 may comprise a bracket 122 extending attached to the resting arm 36 such that the basket 120 is attached to the resting arm 36 in part via the bracket 122 when desired.

In another example, the basket 120 is attached directly to the swivel 32 as shown in FIG. 14 or may be attached directly to the mounting pad 30.

The basket 120 or an equivalent device may form a holder for short handled cleaning brushes, sponges, scrubbing pads, etc. The basket 120 has several advantages, for example it has been found that allowing a cleaning brush 44 to dry with the handle lower than the brushes or cleaning surface often results in the brushes draining onto the handle. This is usually an undesired outcome as the drainage may include cleaning solvents, and food debris, etc. Thus, the disclosed basket 120 in one example holds the cleaning brush 44 in position with the brushes or cleaning surface vertically lower than the handle.

In one example, a system of protrusions and detents on the surface 92 and surface 94 may be used to form a ratchet action and/or hard stop between or at the first position 38 and at the second position 48. In one example, the second position 48 is 90° opposed to the first position 38.

Figure 11:
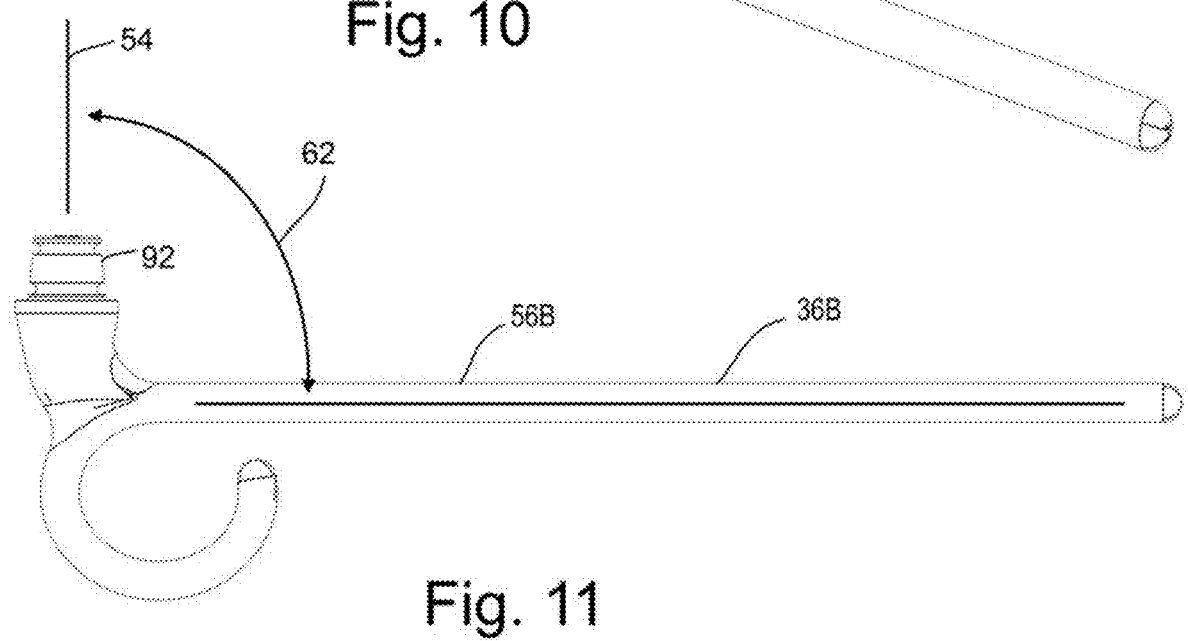
FIG. 11 is a top view of the component shown in FIG. 10.

FIG. 10 and FIG. 11 show another example of a resting arm 36B very similar in some respects to the resting arm 36a shown in FIG. 7. In the example shown in FIGS. 10 and 11, the angle 62 between the longitudinal axis 56b and the axis of rotation 51 is substantially 90°.

Figure 12:
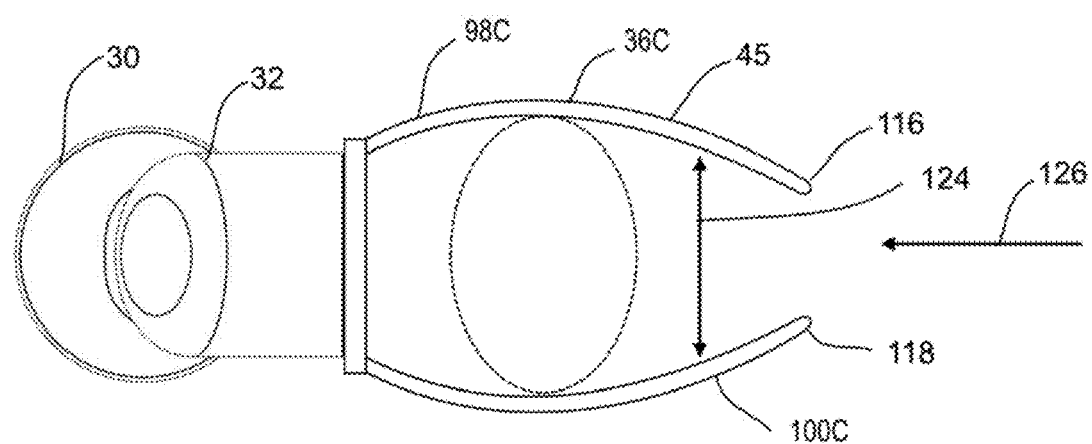
FIG. 12 is another example of the disclosed cleaning apparatus holder.

FIG. 12 shows another example of a resting arm 36C wherein the first shaft 98C is separated from the second shaft 100C in a wishbone-shaped arrangement. Then offset 124 therebetween forming a space for receiving a cleaning apparatus 45. In one example the distal ends 116c and 118C of the first shaft 98C and second shaft 100C form a gap therebetween. The first shaft 98C and second shaft 100C may be biased (bent) apart from each other, allowing the cleaning apparatus to be inserted longitudinally 126 there between and clamped by frictional engagement between the first shaft 98c and second shaft 100C. The cleaning apparatus then may be easily held therein with the cleaning portion (e.g. bristles) positioned below the grasping portion (e.g. handle).

In one example, the resting arm 36c is fixed to the swivel 32. In one example the resting arm 36C is formed as a unitary structure (one component) with the swivel 32. In another example the resting arm 36C rotates relative to the swivel 32.

Figure 16:
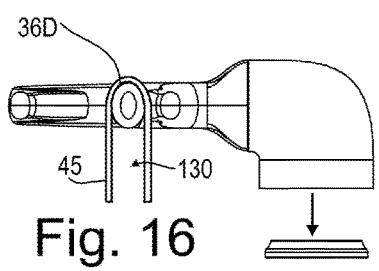
FIG. 16 is an end view of the example shown in FIG. 13.
Figure 17:
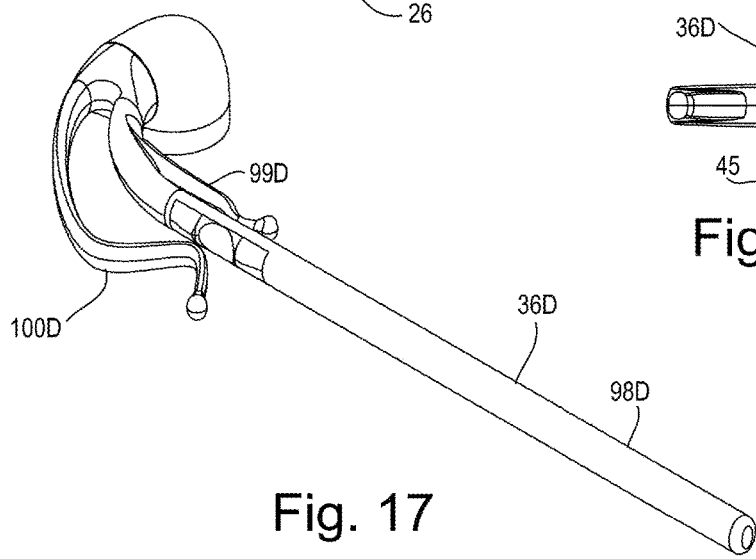
FIG. 17 is a top isometric view of the example shown in FIG. 13.
Figure 18:
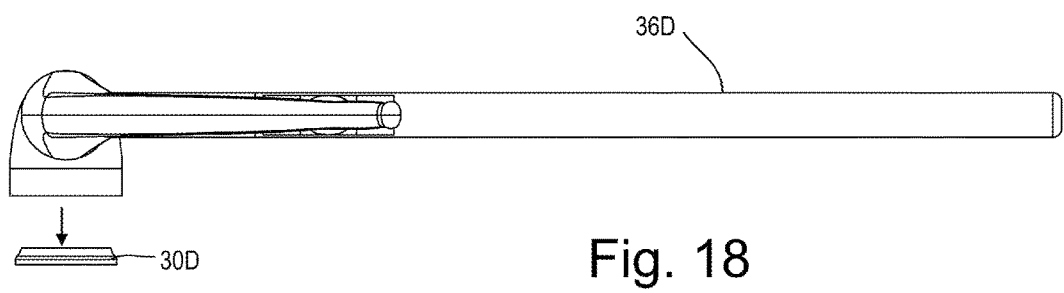
FIG. 18 is a front view of the example shown in FIG. 13.

Looking to FIG. 13, 15-18 is shown another example of a resting arm 36D comprising a substantially linear first shaft 98D. The first shaft 98D of this example extending parallel to a radial line 128. The radial line 128 orthogonal to the rotational axis 51 and offset therefrom such that the resting arm 36D is positioned over the drain basin 26. The resting arm 36 positioned that any liquid draining from the cleaning apparatus 45 attached thereto or resting thereon will drip or drain into the drain basin 26, and from thee into the drain, away from the cleaning apparatus 45 allowing for sufficient drying and a significant reduction in health concerns, odors, etc. by drying the cleaning apparatus 45 above the basin, not dripping nor resting on the faucet or handles, and allowing airflow there around. This as shown in FIG. 16 where the space 130 beneath the cleaning apparatus where a solid structure, like the divider between sink basins will not permit such airflow. The first shaft 98D rigid, in that it does not bend or flex under normal use such as when a water-laden dishcloth (cleaning apparatus 45) is placed thereon.

The example shown in FIG. 13, 15-18 also comprises second shaft 99D on one lateral side of the first shaft 98D. The second shaft 99D having a proximal end 132 connected to the first shaft 98D and a distal end 134 forming a gap 136 into which can be pressed a sponge 42 or other cleaning apparatus 45. The second shaft 99D being at least partially flexible is biased toward the first shaft 98D and thus clamps the sponge 42 or other cleaning apparatus 45 against the first shaft 98D. Where it is often not practical to fold a sponge 42, scouring pad, or similar cleaning apparatus 45 over the first shaft 98D as shown in the right side of FIG. 15, the second shaft provides sanitary drying of the sponge 42 or equivalent cleaning apparatus 45.

The example shown in FIG. 13, 15-18 also comprises third shaft 100D on one lateral side of the first shaft 98D. In this example the third shaft is on the side of the first shaft 98D opposing the second shaft 99D such that cleaning apparatuses may be held simultaneously with each of the second shaft 99D and the third shaft 100D. The third shaft 100D having a proximal end 138 connected to the first shaft 98D and a distal end 140 forming a gap 142 into which can be pressed a scrubbing brush 44, sponge 42 or other cleaning apparatus 45. The third shaft 100D being at least partially flexible is biased toward the first shaft 98D and thus clamps the scrubbing brush 44 or other cleaning apparatus 45 against the first shaft 98D. Where it is often not practical to fold a sponge 42, scouring pad, or similar cleaning apparatus 45.

In the example shown, the third shaft 100D comprises an S-Curve providing a large and easily accessed gap 142 into which the scrubbing brush 44 may be pushed 144 into the gap 142 as the third shaft 100D is pressed outward and thus clamps the scrubbing brush 44 or other cleaning apparatus 45 against the first shaft 98D.

In one example, the first shaft 98D comprises an indent 146 adjacent the inward bend 148 of the S-curve. The indent 146 may be defined by a plurality of detents 150, 152. Thus, as the third shaft 100D is biased toward the first shaft 98D, a small or thin item will be held in place via the bend 148 clamping the cleaning apparatus 45 against the detent 146.

Figure 13:
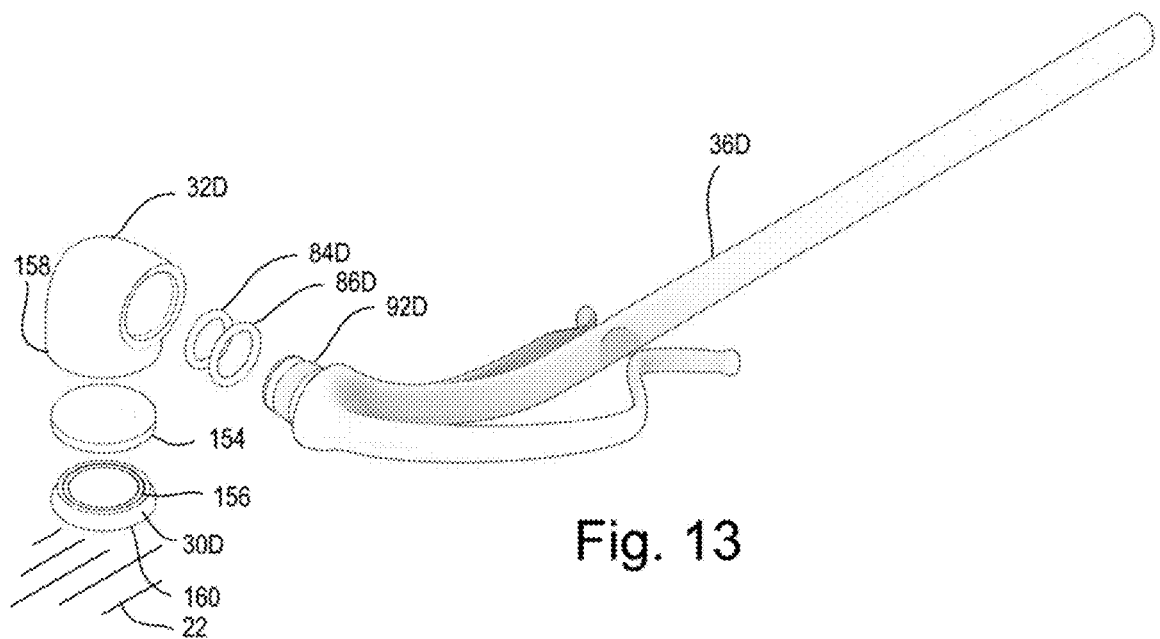
FIG. 13 is an exploded perspective view of another example of the disclosed cleaning apparatus holder.

Looking to FIG. 13 is shown an example where the swivel 32D is attached to the work surface 22 through the mounting pad 30D via a magnet 154. In this example, the magnet is fixed within a magnet cup 156. The magnet cup 156 is configured to focus the magnetic field of the magnet 154 towards the target 158. In one example, the magnet 154 is a neodymium nickel coated magnet. In one example, the magnet cup 156 is formed of stainless steel or other material safe for use in a wet environment. The target 158 being fitted into the swivel 32D and comprising a magnet, ferrous plate, or other material which is pulled toward the magnet 154 by way of the generated magnetic field. As previously discussed, it will be desired that the magnetic force of attraction is greater than the frictional force of the surface 92D and O-rings 84D, 86D against the corresponding surfaces of the swivel 32D. In one example, the magnet 154 exerts 1.8-2.0 lbs. of force against the target 158. In a corresponding example, the adhesive (tape) 160 exerts greater than 2.8 lbs. force between the work surface 22 and the mounting pad 30D. In a broader example, the adhesive 160 exerts a force between the mounting pad 30D and the work surface 22 more than 2× the force exerted by the magnet 154 on the target 158. Thus, the resting arm 36D and swivel 32D will release from the mounting pad 30D before the adhesive 160 releases, potentially damaging the work surface 22 and/or mounting pad 30D.

FIG. 14 shows another example of a basket 120E configured to be attached to the mounting pad 30D described above. In this example a swivel 32E comprises a target 158 and is configured with an armature 162 extending a distance or offset 164 between the center of the mounting pad 30D and the center of a swivel 166. The basket 120E in one example configured to rotate about the pivot 166 and the pivot mounting pad 30D. In one example, an O-ring 168 and receiver 170 cooperate to allow controlled (friction) Thus, any bar soap, cleaner, or liquid leaving the cleaning apparatus 45 within the receiving area 172 will drain by gravity through drainage holes 174 into the drain basin 26 and from there into a drain 176.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept. The invention illustratively disclosed herein suitably may be practiced in the absence of any element which is not specifically disclosed herein.

The invention claimed is:

1. A cleaning apparatus holder assembly comprising:
    a mounting pad configured to be fixed to a work surface adjacent a drain basin;
    the mounting pad comprising a first pivot component having a first axis of rotation;
    a swivel removably mounted to the mounting pad at the first pivot component and configured to rotate relative to the mounting pad about the first axis of rotation;
    the swivel comprising a second pivot component having a second axis of rotation not parallel to the first axis of rotation; and
    a resting arm mounted to the swivel at the second pivot component, configured to rotate relative to the swivel about the second axis of rotation;
    the resting arm configured to be positioned above the drain basin;
    the second axis of rotation defining a lifting plane orthogonal to the second axis of rotation.

2. The cleaning apparatus holder as recited in claim 1 wherein the resting arm comprises a longitudinal axis at an angle of substantially 0° to the lifting plane, such that the longitudinal axis of the resting arm is substantially orthogonal to the axis of rotation of the resting arm to the swivel.

3. The cleaning apparatus holder as recited in claim 1 wherein the resting arm comprises a longitudinal axis at an angle between 5° and 85° to the lifting plane.

4. The cleaning apparatus holder as recited in claim 3 wherein the resting arm comprises a longitudinal axis at an angle between 30° and 60° to the lifting plane.

5. The cleaning apparatus holder as recited in claim 1 wherein the swivel is removably attached to the mounting pad.

6. The cleaning apparatus holder as recited in claim 1 wherein the resting arm comprises a first shaft, a second shaft;
    the first shaft and the second shaft substantially aligned with the longitudinal axis of the resting arm and substantially not parallel to each other, thus forming a gap therebetween.

* * * * *